(12) United States Patent
Feng et al.

(10) Patent No.: US 7,207,067 B2
(45) Date of Patent: Apr. 17, 2007

(54) ENFORCING DATA PROTECTION LEGISLATION IN WEB DATA SERVICES

(75) Inventors: An Feng, Cupertino, CA (US); Frank Minjarez, Hillsborough, CA (US)

(73) Assignee: AOL LLC, Dulles, VA (US)

( * ) Notice: Subject to any disclaimer, the term of this patent is extended or adjusted under 35 U.S.C. 154(b) by 491 days.

(21) Appl. No.: 10/294,009

(22) Filed: Nov. 12, 2002

(65) Prior Publication Data

US 2004/0093518 A1 May 13, 2004

(51) Int. Cl.
- G06F 7/04 (2006.01)
- G06F 17/30 (2006.01)
- G06K 9/00 (2006.01)
- H03M 1/68 (2006.01)
- H04K 1/00 (2006.01)
- G06F 12/14 (2006.01)
- G06F 12/16 (2006.01)
- G07B 17/02 (2006.01)

(52) U.S. Cl. .................. 726/26; 705/405; 705/1; 705/50; 705/51; 707/1; 707/2; 707/3; 707/6; 707/9; 713/193; 715/513; 715/507

(58) Field of Classification Search ............ 713/193, 713/200, 201; 705/405; 707/1–3, 6, 9, 204; 715/513, 507; 726/26
See application file for complete search history.

(56) References Cited

U.S. PATENT DOCUMENTS

| | | | |
|---|---|---|---|
| 5,651,068 A | 7/1997 | Klemba et al. | 380/25 |
| 5,710,814 A | 1/1998 | Klemba et al. | 380/9 |
| 5,740,248 A | 4/1998 | Fieres et al. | 380/25 |
| 5,745,573 A | 4/1998 | Lipner et al. | 380/21 |
| 5,799,086 A | 8/1998 | Sudia | 380/23 |
| 5,835,596 A | 11/1998 | Klemba et al. | 380/25 |
| 5,841,865 A | 11/1998 | Sudia | 380/21 |
| 5,841,870 A | 11/1998 | Fieres et al. | 380/25 |
| 5,852,665 A | 12/1998 | Gressel et al. | 380/30 |
| 5,869,823 A | 2/1999 | Bublitz et al. | 235/380 |
| 5,907,620 A | 5/1999 | Klemba et al. | 380/25 |
| 5,933,503 A | 8/1999 | Schell et al. | 380/25 |

(Continued)

FOREIGN PATENT DOCUMENTS

EP 821 326 1/1998

(Continued)

OTHER PUBLICATIONS

*Eu Data Protection Policy*; L. Bergkamp; Computer Law and Security Report; Jan.-Feb. 2002.

(Continued)

Primary Examiner—Ayaz Sheikh
Assistant Examiner—Shin-Hon Chen
(74) Attorney, Agent, or Firm—Michael A. Glenn; Glenn Patent Group

(57) ABSTRACT

A system and method are provided for enabling Web services to enforce multiple countries' data protection laws and regulations during data collection, data processing storage and data transfer. The system maintains a dynamic list of countries or entities that have been recognized for their adequate data protection. A data collection form is provided that takes into consideration data protection laws of the sovereign in which the form is being filled out. The system prohibits the transfer of personal data in contravention of a local sovereign's data protection laws.

25 Claims, 5 Drawing Sheets

U.S. PATENT DOCUMENTS

| | | | | |
|---|---|---|---|---|
| 5,956,407 | A | 9/1999 | Slavin | 380/30 |
| 5,974,151 | A | 10/1999 | Slavin | 380/30 |
| 5,999,525 | A | 12/1999 | Krishnaswamy et al. | 370/352 |
| 6,009,177 | A | 12/1999 | Sudia | 380/25 |
| 6,031,910 | A | 2/2000 | Deindl et al. | 380/25 |
| 6,058,106 | A | 5/2000 | Cudak et al. | 370/313 |
| 6,058,478 | A | 5/2000 | Davis | 713/191 |
| 6,082,776 | A | 7/2000 | Feinberg | 283/72 |
| 6,104,815 | A | 8/2000 | Alcorn et al. | 380/251 |
| 6,112,188 | A | 8/2000 | Hartnett | 705/35 |
| 6,135,646 | A | 10/2000 | Kahn et al. | 395/200.47 |
| 6,148,083 | A | 11/2000 | Fieres et al. | 380/255 |
| 6,178,504 | B1 | 1/2001 | Fieres et al. | 713/164 |
| 6,178,510 | B1 | 1/2001 | O'Connor et al. | 713/201 |
| 6,212,511 | B1* | 4/2001 | Fisher et al. | 707/1 |
| 6,275,824 | B1* | 8/2001 | O'Flaherty et al. | 707/9 |
| 6,314,409 | B2 | 11/2001 | Schneck et al. | 705/54 |
| 6,335,927 | B1 | 1/2002 | Elliott et al. | 370/352 |
| 6,415,295 | B1 | 7/2002 | Feinberg | 707/104.1 |
| 6,519,617 | B1* | 2/2003 | Wanderski et al. | 715/513 |
| 6,585,778 | B1* | 7/2003 | Hind et al. | 715/513 |
| 2001/0054155 | A1* | 12/2001 | Hagan et al. | 713/193 |
| 2002/0002577 | A1* | 1/2002 | Garg et al. | 709/104 |
| 2002/0010784 | A1* | 1/2002 | Clayton et al. | 709/229 |
| 2002/0111964 | A1* | 8/2002 | Chen et al. | 707/513 |
| 2002/0156761 | A1* | 10/2002 | Chen et al. | 707/1 |
| 2003/0014557 | A1* | 1/2003 | Berger et al. | 709/128 |
| 2003/0014654 | A1* | 1/2003 | Adler et al. | 713/200 |
| 2003/0018898 | A1* | 1/2003 | Lection et al. | 713/182 |
| 2003/0041033 | A1* | 2/2003 | Kaplan | 705/64 |
| 2003/0088520 | A1* | 5/2003 | Bohrer et al. | 705/74 |
| 2003/0097383 | A1* | 5/2003 | Smirnov et al. | 707/204 |
| 2003/0101341 | A1* | 5/2003 | Kettler et al. | 713/162 |
| 2003/0140068 | A1* | 7/2003 | Yeung | 707/204 |
| 2003/0229850 | A1* | 12/2003 | Lue | 715/513 |
| 2004/0054918 | A1* | 3/2004 | Duri et al. | 713/200 |
| 2004/0088295 | A1* | 5/2004 | Glazer et al. | 707/9 |

FOREIGN PATENT DOCUMENTS

| | | |
|---|---|---|
| EP | 1 001 358 | 5/2000 |
| EP | 1 160 645 | 12/2001 |
| EP | 1 193 587 | 4/2002 |
| EP | 1 217 857 | 6/2002 |

OTHER PUBLICATIONS

*Transferring Personal Data to the USA*; G. Bull; Computer Law and Security Report; Jul.-Aug. 2001.

*E-Commerce: Does the Data Protection Act 1998 Apply to Offshore E-business*; P. Carey; Computers and Law; Aug.-Sep. 2000.

*European Data Protection: Determining Applicable Law Pursuant to European Data Protection Legislation*; L.A. Bygrave; Computer Law and Security Report; Jul.-Aug. 2000.

*Evaluating Certificate Status Information Mechanisms*; John Iiadis, Diomidis Spinellis, Sokratis Katsikas, Dimitris Gritzalis, and Bart Preneel.

*Enterprise Security: Legal Challenges and Possible Solutions*; E.M. Weitzenboeck; Proceedings Tenth IEEE International Workshop on Enabling Technologies: Infrastructure for Collaborative Enterprises; Jun. 20-22, 2001.

*Target Audience Practice*; P. Taylor; Financial World; Oct. 2001.

*Implications of the New EU Directive on Data Protection for Multinational Corporations*; R.M. Walczuch, L. Steeghs; Information Technology & People; 2001.

*The Impact of Data Protection Legislation on Intranets*; M. White; Econtent; Aug.-Sep. 2000.

*Habeas Data: the Latin-American Response to Data Protection*; A. Guadamuz; JILT-Journal of Information Law & Technology; 2000.

*Smartcards for Trusted Data Transfer in Renal Replacement Therapy in Germany*; H.J. Schober-Halstenberg; Health Cards '97; Nov. 12-14, 1997.

*Data Protection Update*; R. Jay; Computers and Law; Dec. 1999-Jan. 2000.

*Implementing the European Union Data Protection Directive 1995 in UK Law: the Data Protection Act 1998*; A. Charlesworth; Government Information Quarterly; 1999.

*Age of Consent [1998 Data Protection Act]*- J. Mortleman; Business & Technology; Jul. 1999.

*Walk on the Wild Side*; A. Gurton; Accountancy; Jun. 1999.

*Time to Get Personal [data protection legislation]*; A. Hinde; Computer Bulletin; Jan. 1998.

*Guaranteeing Requirements of Data-Protection Legislation in a Hospital Information System with Privacy-Enhancing Technology*; G. von Blarkom; BJHC & IM-British Journal of Healthcare Computing & Information Management; May 1998.

*Homeworking: No Longer An East Option?*; C. Pounder; Computers & Security; 1998.

*Data Protection in the Republic of Ireland*; R. Calrk; JILT-Journal of Information Law & Technology; Jan. 31, 1996.

*SEISMED: Secure Environment for Information Systems in Medicine*; J. Davey; Computer Methods and Programs in Biomedicine; Oct. 1994.

*Conference Report: Electronic Banking Law Conference*; A. Charlesworth; Computers and Law; Jun.-Jul. 1994.

*The Discussion on 'Social impact of Computing' in the FRG: A Status Report*; K. Brunnstein; Comparative Worldwide National Computer Policies. Proceedings of the Third IFIP TC9 Conference on Human Choice and Computers; Sep. 2-5, 1985.

*The Social and Legal Implications of Two-Way Television Services*; B.C. Burrows, and S. Flood; Data Privacy and Security. State of the Art Report; 1985.

*Data Privacy an Security, State of the Art Report*; J.J.P. Kenny; 1985.

*Integrity, Security and Privacy of Microcomputers*; A.D. Chambers; Microcomputing. State of the Art Report; 1985.

*Dataflow across National Borders*; H.H. Collier; Data Processing; Sep. 1985.

*The Federal Data Protection Law Supervising the Correct Application of Data Processing Programs*; F. Bohlick, D. Hinz, H. Jest, W. Lobel, H. Niggemeyeer, H. Nikolin; G.T. Rache, H. Richter, E. Schlatter, K. Schmidt, and H. Thiele; Elektrizitaetswirtschaft; Jun. 4, 1984.

* cited by examiner

ENFORCING DATA PROTECTION LEGISLATION IN WEB DATA SERVICES

TECHNICAL FIELD

The invention relates generally to Web data service. More particularly, the invention relates to a system and method for enforcing multiple countries' and/or entities' data protection rules in data collection, data transfer, and data processing.

BACKGROUND OF THE INVENTION

Web services provide a way to expose some business functionality over the Internet using a standardized way of integrating Web-based applications using the extensible Markup Language (XML), Simple Object Access Protocol (SOAP), Web Services Description Language (WSDL) and Universal Discovery and Description Interface (UDDI) open standards over an Internet protocol backbone. XML is used to tag the data, SOAP is used to transfer the data, WSDL is used for describing the services available, and UDDI is used for listing what services are available. Used primarily as a means for businesses to communicate with each other and with clients, Web services allow organizations to communicate data without intimate knowledge of each other's IT systems behind the firewall.

Unlike traditional client/server models, such as a Web server/Web page system, Web services do not provide the user with a GUI. Web services instead share business logic, data, and processes through a programmatic interface across a network. Developers can then add the Web service to a GUI, such as a Web page or an executable program, to offer specific functionality to users.

Web services are not independent of Web applications. Web applications form the technology foundation and Web services provide the glue for interactions and integration. Web services allow different applications from different sources to communicate with each other without time-consuming custom coding, and because all communication is in XML, Web services are not tied to any one operating system or programming language. For example, Java can talk with Practical Extraction and Report Language (Perl), Windows applications can talk with UNIX applications.

In a Web service system, a client who calls for a function formats a request with SOAP XML encoding and sends it to the server over a mutually agreeable communication protocol such as HyperText Transfer Protocol (HTTP) or Simple Mail Transfer Protocol (SMTP). The server runs some sort of a listener that accepts the incoming SOAP calls, reads the information from the XML SOAP packets, and maps them to business logic processing application software on the server. The application layer on the server processes the request and returns output to the listener, which formats the output into a response packet in the SOAP XML encoding and returns it to the client.

Security is a primary consideration when choosing a Web service for all applications. Web services security requirements include authentication, authorization, and data protection.

Authentication ensures that each entity involved in using a Web service is what it actually claims to be. Authentication involves accepting credentials from the entity and validating them against an authority.

Authorization determines whether the service provider has granted access to the Web service to the requestor. Basically, authorization confirms the service requestor's credentials. It determines if the service requestor is entitled to perform the operation, which can range from invoking the Web service to executing a certain part of its functionality.

With regard to data protection, Web services have to abide by relevant data protection laws if the transaction is conducted in the jurisdiction. Many countries and international organizations, such as U.S; Finland, Sweden, Germany, as well as OECD, have promulgated personal data protection laws and regulations. The laws and regulations are not same in all aspects. This brings difficulties in deploying the Web service product in multiple jurisdictions.

What is desired is a Web service that supports multiple countries' and entities' data protection laws and regulations.

SUMMARY OF THE INVENTION

A system architecture model for Web services is provided in which data protection laws and regulations are enforced during data collection, data processing storage, and data transfer. The system maintains a dynamic list of countries or entities that have been recognized for their adequate data protection. A data collection form is provided that takes into consideration data protection laws of the sovereign in which the form is being filled out. The system prohibits the transfer of personal data in contravention of a local sovereign's data protection laws.

Specifications of data protection legislation are formalized such that they can be treated as a configuration file. Each specification consists of four sections, i.e. legal properties; policies for data collection, policies for data processing, and policies for data transfer, and it describes a data protection legislation of the host country of a Web service. All data recipients of a Web service register its country code, organization ID, business classification, purpose IDs and contact information of its data controller.

DETAILED DESCRIPTION OF THE INVENTION

Figure 1:
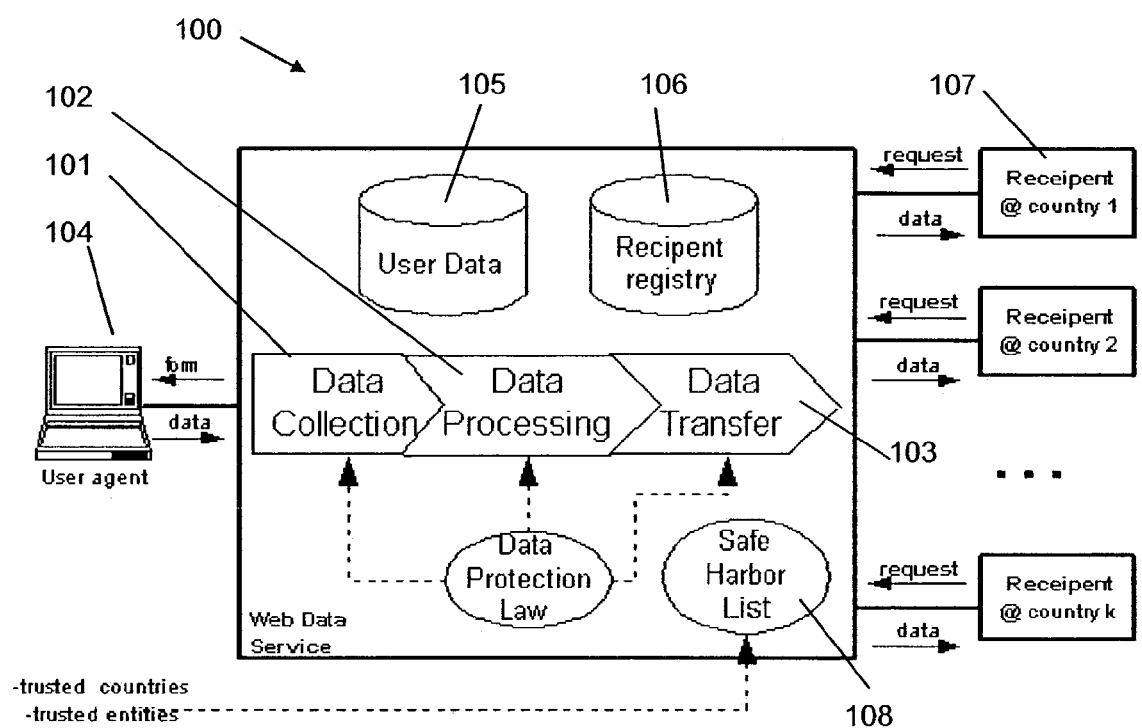
FIG. 1 is block diagram illustrating a system architecture model of Web service with law enforcement support according to the invention.

FIG. 1 is block diagram illustrating a system architecture model of Web service 100 with law enforcement support. In this system, data protection laws and regulations are enforced at three key stages, i.e. data collection 101, data processing 102, and data transfer 103. In the data collection stage 101, the Web service creates a data collection form while taking into consideration data protection laws. For example, Swedish law prevents Web services from collecting religious data. After the user completes the form and returns it via the user agent 104, the Web service 100 processes the data collected and stores it in the cache 105. In some countries, such as in Germany, data protection law prohibits sensitive personal data from being transferred to entities/countries that have not established "adequate" data protection. These laws are then enforced at the data transfer stage 103.

The system 100 maintains a list of countries/entities 108 that have been recognized for their "adequate" data protection. This dynamic list can be assembled from various sources, such as USA's Safe Harbor List at http://web.ita-.doc.gov/safeharbor/shlist.nsf/webPages/safe+harbor+list.

The Web service 100 also contains registration information about data recipients 106. All data recipients of the Web service 100 have the following information registered:
- country code . . . This enables system to decide whether the country of a recipient has adequate data protection.
- organization ID . . . This enables system to decide whether the organization of a recipient has adequate data protection.
- business classification . . . e.g. ISP, Health, etc.
- Purpose IDs . . . ie., the purposes of the data retrieval? e.g. research, commerce and marketing
- contact information of its data controllers The Web service 100 formally specifies data protection legislation so that such a specification could be treated as a configuration file. For example, each specification consists of four sections, and it describes a data protection legislation of the host country of a Web service:
- <PatternDef> & <LegalAttribute> . . . Legal properties (attribute) specification for user data entries
- <DataCollectionPolicies> . . . ACL policies for data collection
- <DataPorcessingPolicies> . . . ACL policies for data processing
- <DataTrasferPolicies> . . . ACL policies for data transfer A list of <PatternDef> and <LegalAttribute> are used in the following format:

<Pattern Def name=PatternName>1. . . n

A list of XML queries that describe the entries to be included or excluded

```
</PatternDef>
<LegalAttribute name=Attribute Name>1..n
  <LegalValue val=Attribute Value>1..n
   A list of Pattern names
  </LegalValue>
</LegalAttribute>
```

For example, the following XML segments define 3 data patterns (Name, Birth-Year, and Religion), assign legal attribute value "Sensibility=NO" to Name/Birth-Year patterns, and assign legal attribute value "Sensibility=YES" to Religion pattern.

```
<PatternDef name="Name">
  <include xpath="contact/name"/>
</PatternDef>
<PatternDef name="Birth-Year">
  <include xpath="demographic/birthDate/year"/>
</PatternDef>
<PatternDef name="Religion">
  <include xpath="demographic/religion"/>
</PatternDef>
<LegalAttribute name=" Sensibility">
  <LegalValue val="NO">
    <Pattern ref="Name"/>
    <Pattern ref="Birth-Year"/>
  </LegalValue>
```

-continued

```
  <LegalValue val="YES">
    <Pattern ref="Religion"/>
  </LegalValue>
</LegalAttribute>
```

Access Control List (ACL) policies (<DataCollectionPolicies>, <DataPorcessingPolicies> and <DataTrasferPolicies>) could be stated in OASIS XACML format or other mechanisms. These policies refer to various data such as:
- Legal attribute values of data entries, as defined above
- Characteristics of data recipients, such as their registration data and adequate data protection status
- Data owner's permission information, such as whether an explicit consent was given for a request
- Request parameters The following XML segments illustrate some formal definition of German "Federal Data Protection Act" in OASIS XACML style. The following <DataPorcessingPolicies> states that non-sensitive personal data (as defined by <LegalAttribute name=_"Sensibility"> above) could be processed. Our <DataTrasferPolicies> states that personal data should not be transferred to a non-safe-harbor US requestor, i.e. the entity is not included in the Safe Harbor List 108.

```
<DataPorcessingPolicies>
  <XACML:rule Effect="Permit">
    <Target>
      <Resources>
        <Attribute AttributeName="Sensibility">
          <AttributeValue>NO</AttributeValue>
        </Attribute>
      </Resources>
      <Actions>*</Actions>
    </Target>
  </XACML:rule>
</DataPorcessingPolicies>
<DataTrasferPolicies>
  <XACML:rule Effect="Deny">
    <Target>
      <Subjects>
        <Attribute AttributeName="CountryCode">
          <AttributeValue>US</AttributeValue>
        </Attribute>
        <Attribute AttributeName="SafeHarbor">
          <AttributeValue>NO</AttributeValue>
        </Attribute>
      <Resources>*</Resources>
    </Target>
  </XACML:rule>
</DataTrasferPolicies>
```

To empower the Web service to support multiple countries' data protection laws and regulations, the system includes a separate legislation specification for each country. The Web service can decide which legislation to be applied based on various factors, such as request URL (http:// profile.service.se or http://profile.service.de) and data owner's citizenship, etc.

Data protection laws are enforced at three different stages.

1. Enforcing Data Protection Laws in Collecting Personal Data:

The Web service 100 creates data collection forms from the predefined form templates and the legislation specification described above.

Then, the Web service 100 introduces form template language. Form templates are XML/HTML/WML forms embedded with tags %data_collected=Pattern(s)% that indicate what data are to be collected. For example:

```
<HTML>...
    <XXX %data_collected=Pattern1% ...> ... </XXX>
    ...
    <YYY %data_collected=Pattern2% ...> ... </YYY>
    ... </HTML>
```

An XML/HTML/WML element is removed if ACL policies <DataCollectionPolicies> states that such data should not be collected.

The following HTML template illustrates an HTML page collecting user's first/last names, birth year and religion. It has three <pre> elements that associate with %data_collected=Name%, %data_collected=Birth-Year%, and %data_collected=Religion%. By applying our formal specification of Swedish Law, the $3^{rd}$ node (<pre %data_collected=Religion%>) will be removed from HTML form since Sweden does not allow collecting religious data.

```
<HTML>
<HEAD><TITLE>Your Data</TITLE></HEAD>
<BODY>
<FORM ACTION="some.cgi" method="post">
<pre %data_collected=Name%>
    <b>Last name:</b> <Input type="text" name=last_name size=16 maxlength=16>
    <b>First name:</b> <Input type="text" name=first_name size=16 maxlength=16>
</pre>
<pre %data_collected=Birth-Year%>
    <b>Year of birth:</b><Input type="text" name=byear size=4 maxlength=4>
</pre>
<pre %data_collected=Religion%>
    <b>Religion:</b> <select size="1" name="religion">
    <option value="Buddhism">Buddhism
    <option value="Christianity">Christianity
    <option value="Ecumenical">Ecumenical
    <option value="Hinduism">Hinduism
    <option value="Islam">Islam
    </select>
</pre>
</FORM>
</BODY></HTML>
```

Figure 2:
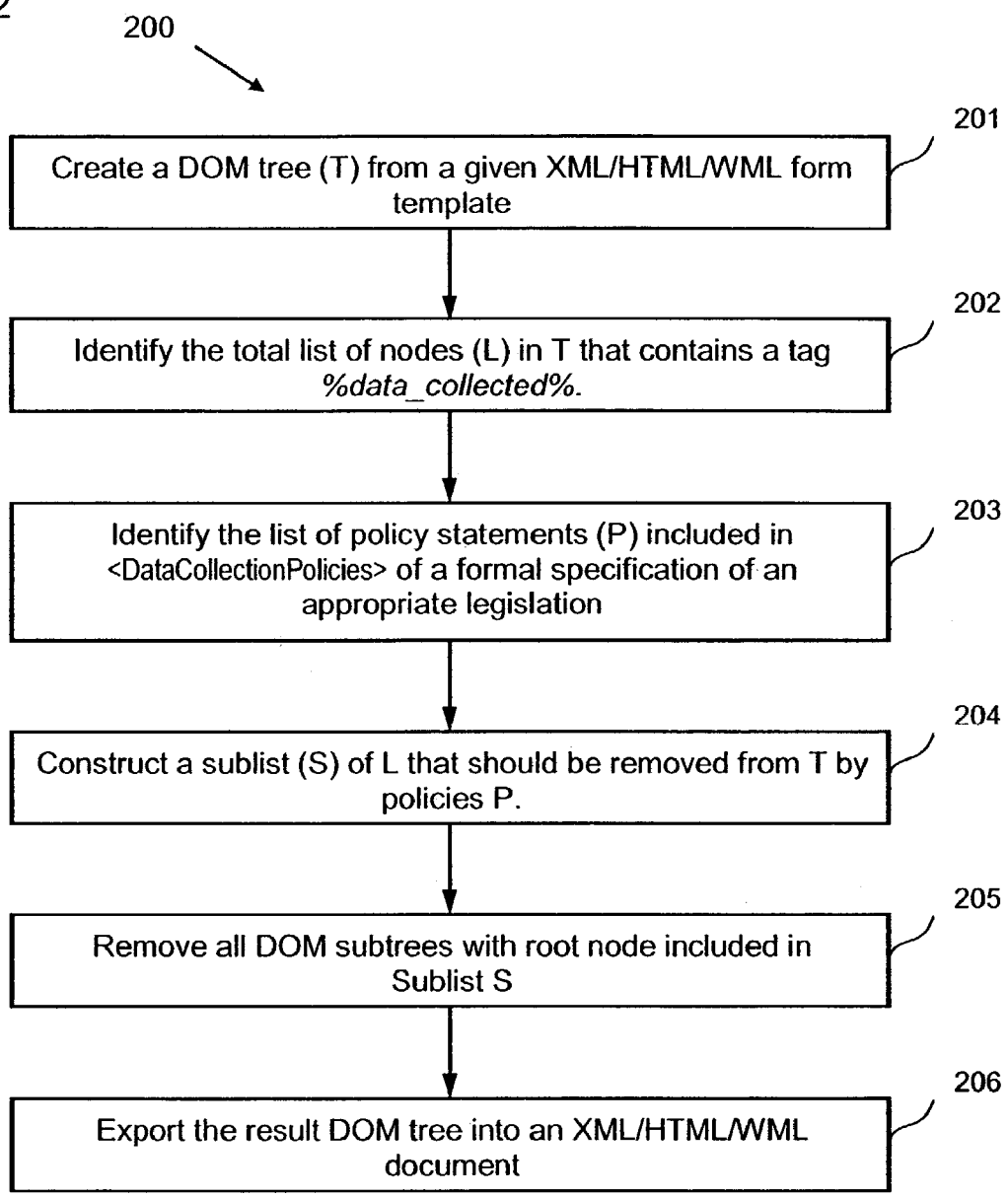
FIG. 2 is a flow diagram illustrating a method for enforcing data protection laws in collecting personal data.

FIG. 2 is a flow diagram illustrating a method to enforce data protection law in collecting personal data. The method comprises the following steps:

Step 201: Create a DOM tree from the given XMUHTML/WML form template;

Step 202: Identify the total list (L) of DOM tree nodes containing a tag %data_collected%;

Step 203: Identify the list of policy statements (P) included in <DataCollectionPolicies> of a formal specification of an appropriate legislation;

Step 204: Construct a sublist (S) of L that should be removed from the DOM tree by policies P;

Step 205: Remove all DOM sub-trees with root node included in the Sublist S; and Step 206: Export the result DOM tree into an XML/HTML/WML document.

Figure 3:
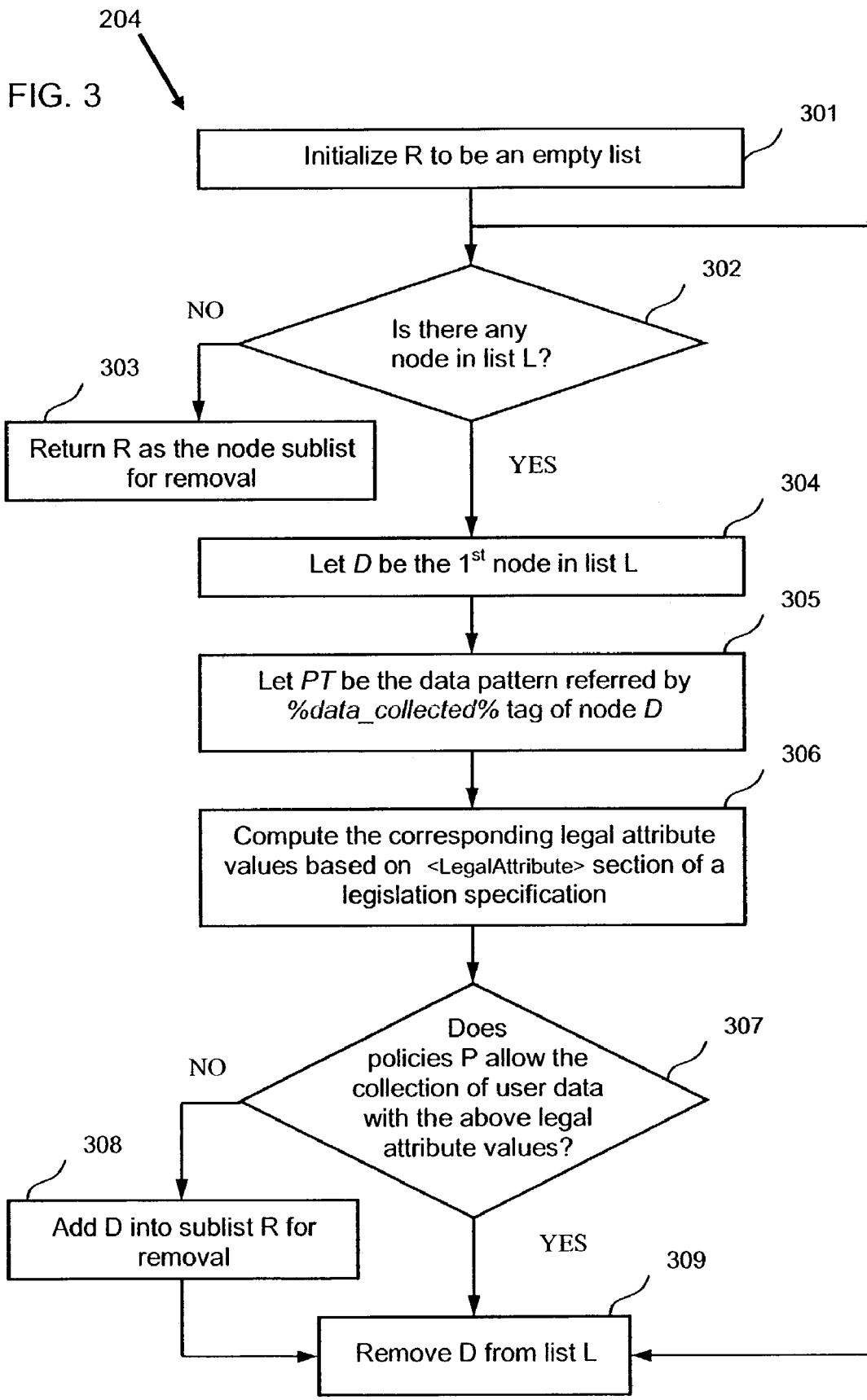
FIG. 3 is a flow diagram illustrating the details of Step 204 of the method of FIG. 2.

Now referring to FIG. 3, which is a flow diagram illustrating the details of Step 204:

Step 301: Initialize R to be an empty list;

Step 302: Check whether there is any node in list L (see Step 202);

Step 303: If the check result in Step 302 is no, then return R as the node sublist for removal;

Step 304: If the check result in Step 302 is yes, then let D be the first node in list L;

Step 305: Let PT be the data pattern referred by %data_collected% tag node D;

Step 306: Compute the corresponding legal attribute values based on <LegalAttribute> section of a legislation specification;

Step 307: Apply <DataCollectionPolicies> to determine whether the data of pattern PT could be collected or not;

Step 308: If the result in Step 307 is not, then add D into sublist R for removal, continuing with step 309; and Step 309: If the result in Step 307 is yes, then remove the current DOM substree D from the list L.

Figure 4:
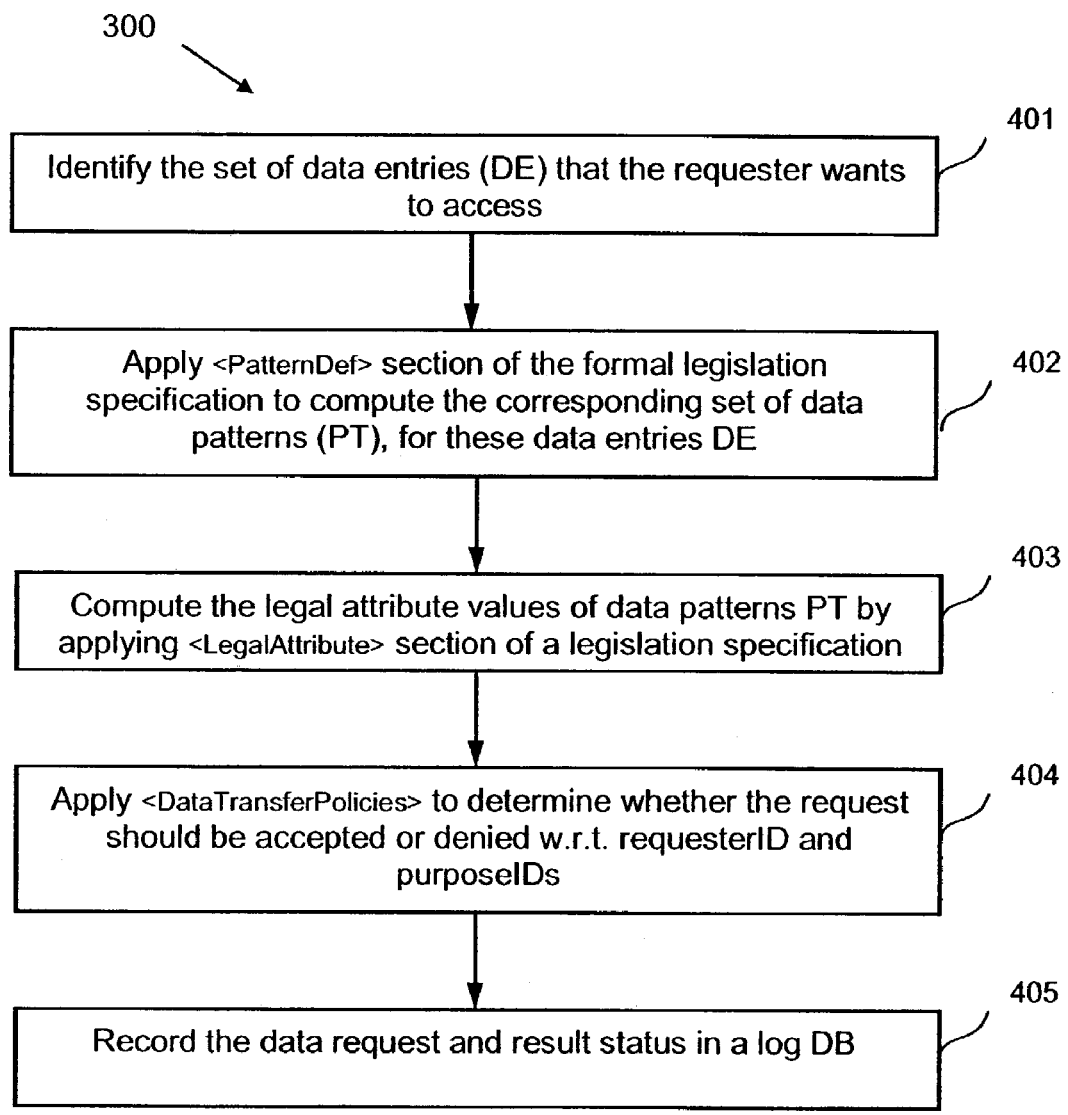
FIG. 4 is a flow diagram illustrating a method for enforcing data protection laws in transferring personal data.

2. Enforcing Data Protection Laws in Transferring Personal Data:

Each request made by a recipient (e.g.107 in FIG. 1) includes a request header:
  requesterID . . . indicates who is making the request
  purpose ID . . . indicates the purposes of this data inquiry
    p Now referring to FIG. 4, which is a flow diagram illustrating a method for executing the request:

Step 401: Identify the set of requested data entries (DE) that the requester wants to access;

Step 402: Apply <PatternDef> section of the formal legislation specification to compute the corresponding set of data patterns (PT), for these data entries DE;

Step 403: Compute the legal attribute values of data patterns PT by applying <LegalAttribute> section of a legislation specification;

Step 404: Apply <DataTransferPolicies> to determine whether the request should be accepted or denied; and Step 405: Record the data request and result status in a log database.

Figure 5:
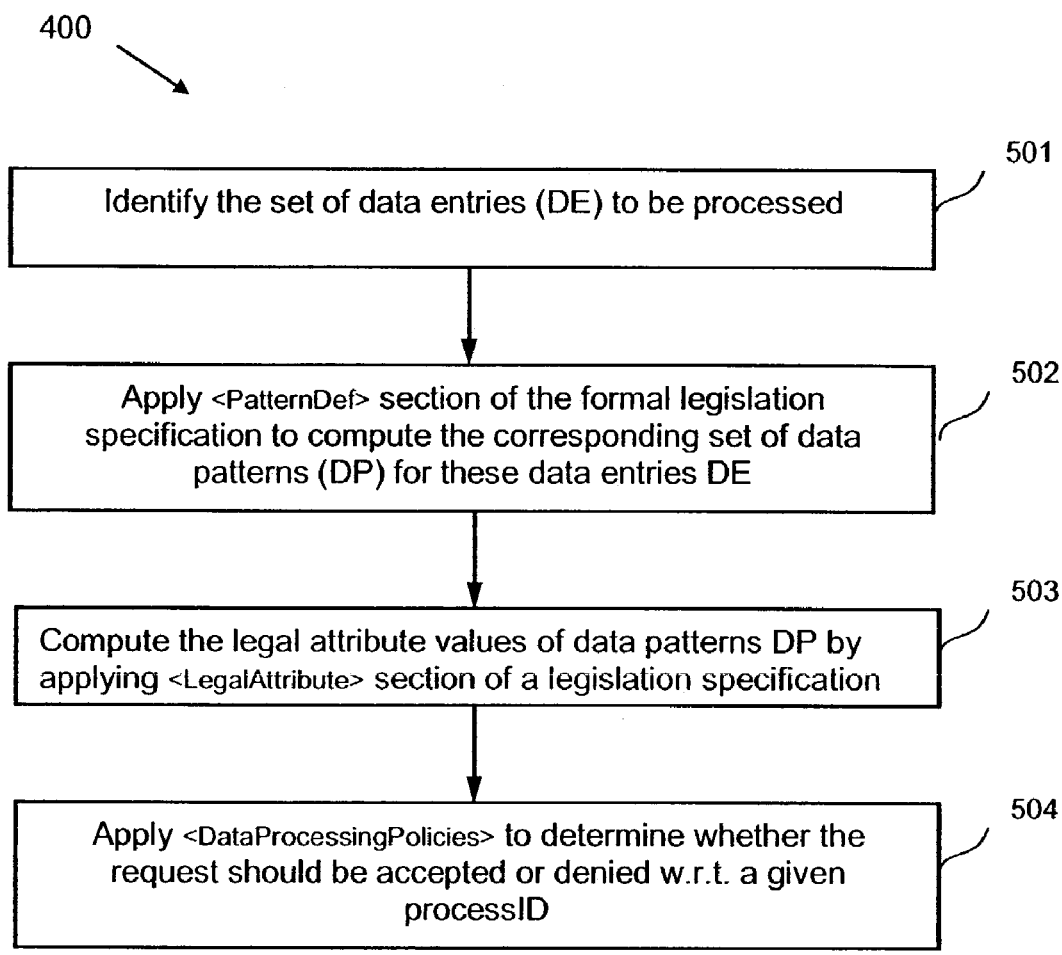
FIG. 5 is a flow diagram illustrating a method for enforcing data protection laws in other data processing.

3. Enforcing Data Protection Laws in other Data Processing:

Now referring to FIG. 5, which is a flow diagram illustrating a method for enforcing data protection laws in other data processing:

Step 501: Identify the set of requested data entries (DE) to be processed;

Step 502: Apply <PatternDef> section of the formal legislation specification to compute the corresponding set of data patterns (DP) for these data entries DE;

Step 503: Compute the legal attribute values of these data entries (DE) by applying <LegalAttribute> section of a legislation specification; and Step 504: Apply <DataProcessingPolicies> to determine whether the request should be accepted or denied.

Although the invention is described herein with reference to the preferred embodiment, one skilled in the art will readily appreciate that other applications may be substituted for those set forth herein without departing from the spirit and scope of the present invention.

Accordingly, the invention should only be limited by the Claims included below.

The invention claimed is:

1. A method for enforcing multiple countries' or/and entities' data protection rules in a Web service, said Web service maintaining a dynamic list of countries or/and entities that have been recognized for adequate data protection and maintaining a set of identification parameters for each registered data recipients, said method comprising the steps of:

formalizing data protection rules for each country or entity into specifications, each of said specifications being treated as a configuration file;

enforcing a first set of data protection rules while collecting personal data from users;

wherein said step of enforcing a first set of data protection rules further comprises the steps of:

creating a document object model (DOM) tree from a given XML form template;

identifying a total list of nodes in said DOM tree that contain a tag for data collection:

identifying a list of policy statements in a formal specification of a data protection rule:

constructing a sub-list of said total list of nodes that should be removed from said DOM tree according to said list of policy statements;

removing all DOM trees with root node included in said sub-list; and exporting the remaining DOM tree into text format;

enforcing a second set of data protection rules while transferring personal data; and enforcing a third set of data protection rules while processing personal data collected from users.

2. The method of claim 1, wherein each of said specifications comprises four sections:

pattern definition and legal attribute;

a first access control list (ACL) for data collection policies;

a second access control list (ACL) for data transfer policies; and a third access control list (ACL) for data processing policies.

3. The method of claim 1, further comprising the steps of:

initializing a set of DOM nodes whose sub-trees should be removed;

checking whether there is any node in said total list;

if no, returning said set of DOM nodes as the node sub-list for removal;

if yes, designating the current DOM node as the first node in said total list;

designating a data pattern referred by said tag for data collection associated with said current DOM node;

computing the corresponding legal attribute values of said data pattern;

checking whether said list of policy statements allow to collect the user's data with said legal attribute values;

if yes, removing said current DOM node from said total list; and if no, adding said current DOM node into said set of DOM nodes whose sub-trees should be removed.

4. The method of claim 1, wherein said step of enforcing a second set of data protection rules further comprises the steps of:

identifying a set of data entries included in a data recipient's request;

applying a configuration criteria to compute a corresponding set of data patterns for said set of data entries;

computing the legal values of said set of data patterns;

applying an access control list (ACL) for data transfer to determine whether said request should be accepted or denied; and recording said request and result status in a log database.

5. The method of claim 1, wherein said step of enforcing a third set of data protection rules further comprises the steps of:

identifying a set of data entries included in a data recipient's request;

applying a configuration criteria to compute a corresponding set of data patterns for said set of data entries;

computing the legal values of said set of data patterns; and applying an access control list (ACL) for data processing to determine whether said request should be accepted or denied.

6. In a Web service which maintains a dynamic list of countries or/and entities that have been recognized for adequate data protection, wherein data protection rules for each country or entity are formally specified, and wherein data recipients have registered with said Web service a set of identification parameters, a method for enforcing multiple countries' or/and entities' data protection rules while collecting personal data, comprising the steps of:

enforcing a first set of data protection rules while processing personal data collected from users; and enforcing a second set of data protection rules while transferring personal data;

wherein said step of collecting comprises a third set of data protection rules comprising the steps of:

creating a document object model (DOM) tree from a given XML form template;

identifying a total list of nodes in said DOM tree that contain a tag for data collection;

identifying a list of policy statements in a formal specification of a data protection rule;

constructing a sub-list of said total list of nodes that should be removed from said DOM tree according to said list of policy statements;

removing all DOM trees with root node included in said sub-list; and exporting the remaining DOM tree into text format.

7. The method of claim 6, wherein the constructing step further comprises the steps of:

initializing a set of DOM nodes whose sub-trees should be removed;

checking whether there is any node in said total list;

if no, returning said set of DOM nodes as the node sub-list for removal;

if yes, designating the current DOM node as the first node in said total list;

designating a data pattern referred by said tag for data collection associated with said current DOM node;

computing the corresponding legal attribute values of said data pattern;

checking whether said list of policy statements allow to collect the user's data with said legal attribute values;

if yes, removing said current DOM node from said total list; and if no, adding said current DOM node into said set of DOM nodes whose sub-trees should be removed.

8. The method of claim 6, further comprising the step of:

deciding which country or entity's rules to be applied based on any of:

request URL; and data owner's citizenship.

9. In a Web service which maintains a dynamic list of countries or/and entities that have been recognized for adequate data protection, wherein data protection miss for each country or entity are formally specified, and wherein all data recipients have registered with said Web service a set of identification parameters, a method for enforcing multiple countries' or/and entities' data protection rules while transferring personal data, comprising the steps of:

enforcing a first set of data protection rules while collecting personal data from users;

wherein said step of transferring comprises a second set of data protection rules comprising the steps of:
identifying a set of data entries included in a data recipient's request;
applying a configuration criterion to compute a corresponding set of data patterns for said set of data entries;
computing the legal values of said set of data patterns;
applying an access control list (ACL) for data transfer to determine whether said request should be accepted or denied; and
recording said request and result status in a log database; and
enforcing a third set of data protection rules while processing personal data collected from users.

10. The method of claim 9, wherein each request made by a data recipient comprises a requester identification and a purpose identification.

11. The method of claim 9, further comprising the step of:
deciding which country's or entity's rules to be applied based on any of:
request URL; and
data owner's citizenship.

12. In a Web service which maintains a dynamic list of countries or/and entities that have been recognized for adequate data protection, wherein data protection rules for each country or entity are formally specified, and wherein all data recipients have registered with said Web service a set of identification parameters, a method for enforcing multiple country's or/and entities' data protection rules while processing personal data, comprising the steps of:
enforcing a first set of data protection rules while collecting personal data from users; and
enforcing a second set of data protection rules while transferring personal data;
wherein said step of processing comprises a third set of data protection rules comprising the steps of:
identifying a set of data entries included in a data recipient's request;
applying a configuration criterion to compute a corresponding set of data patterns for said set of data entries;
computing the legal values of said set of data patterns; and
applying an access control list (AOL) for data processing to determine whether said request should be accepted or denied.

13. The method of claim 12 further comprising the step of:
deciding which country or entity's rules to be applied based on any of:
request URL; and
data owner's citizenship.

14. In a Web service which maintains a dynamic list of countries or/and entities that have been recognized for adequate data protection, wherein data recipients have registered with said Web service a set of identification parameters, an apparatus for enforcing multiple countries' or/and entities' data protection rules comprising:
means for formalizing data protection rules for each country or entity into specifications, each of said specifications being treated as a configuration file;
means for enforcing a first set of data protection rules while collecting personal data from users;
means for enforcing a second set of data protection rules while transferring personal data; and
means for enforcing a third set of data protection rules while processing personal data collected from users.

15. The apparatus of claim 14, wherein each of said specifications comprises four sections:
pattern definition and legal attribute;
a first access control list (ACL) for data collection policies;
a second access control list (ACL) for data transfer policies; and
a third access control list (ACL) for data processing policies.

16. The apparatus of claim 14, wherein said means for enforcing a first set of data protection rules performs the operations of:
creating a document object model (DOM) tree from a given XML form template;
identifying a total list of nodes in said DOM tree that contain a tag for data collection;
identifying a list of policy statements in a formal specification of a data protection rule;
constructing a sub-list of said total list of nodes that should be removed from said DOM tree according to said list of policy statements;
removing all DOM trees with root node included in said sub-list; and
exporting the remaining DOM tree into text format.

17. The apparatus of claim 16, wherein said means for enforcing a first set of data protection rules further performs operations of:
initializing a set of DOM nodes whose sub-trees should be removed;
checking whether there is any node in said total list;
if no, returning said set of DOM nodes as the node sub-list for removal;
if yes, designating the current DOM node as the first node in said total list;
designating a data pattern referred by said tag for data collection associated with said current DOM node;
computing the corresponding legal attribute values of said data pattern;
checking whether said list of policy statements allow to collect the user's data with said legal attribute values;
if yes, removing said current DOM node from said total list; and
if no, adding said current DOM node into said set of DOM nodes whose sub-trees should be removed.

18. The apparatus of claim 14, wherein said means for enforcing a second set of data protection rules performs the operations of:
identifying a set of data entries included in a data recipient's request;
applying a configuration criteria to compute a corresponding set of data patterns for said set of data entries;
computing the legal values of said set of data patterns;
applying an access control list (ACL) for data transfer to determine whether said request should be accepted or denied; and
recording said request and result status in a log database.

19. The apparatus of claim 14, wherein said means for enforcing a third set of data protection rules performs the operations of:
identifying a set of data entries included in a data recipient's request;
applying a configuration criteria to compute a corresponding set of data patterns for said set of data entries;
computing the legal values of said set of data patterns; and
applying an access control list (ACL) for data processing to determine whether said request should be accepted or denied.

20. An apparatus for providing Web service that supports enforcement of data protection rules of multiple countries or/and entities, comprising:
- means for registering each data requester's identification information;
- means for maintaining a dynamic list of countries and entities that have been recognized for adequate data protection;
- a set of formalized specifications of data protection rules, each of said specification being treated as a configuration file;
- means for enforcing a first set of data protection rules on collecting personal data;
- means for enforcing a second set of data protection rules on data transfer;
- means for enforcing a third set of data protection rules on data processing; and
- means for deciding which country or entity's data protection rule to be applied.

21. The apparatus of claim 20, wherein said each data requester's identification information comprises any of:
- country code;
- organization identification;
- business classification;
- purpose identifications; and
- contact information of said requesters data controller.

22. The apparatus of claim 20, wherein each of said specifications comprises four sections:
- pattern definition and legal attribute;
- a first access control list (ACL) for data collection policies;
- a second access control list (ACL) for data transfer policies; and
- a third access control list (ACL) for data processing policies.

23. The apparatus of claim 20, wherein said means for enforcing data protection rules on collecting personal data comprises:
- data collection forms created from form templates and said specifications; and
- form template language.

24. The apparatus of claim 20, wherein said means for enforcing data protection rules on data transfer executes a request by performing the steps of:
- identifying a set of data entries included in said request;
- applying a configuration criteria to compute a corresponding set of data patterns for said set of data entries;
- computing the legal values of said set of data patterns;
- applying an access control list (ACL) for data transfer to determine whether said request should be accepted or denied; and
- recording said request and result status in a log database.

25. The apparatus of claim 20, wherein said means for enforcing data protection rules on data processing executes a request by performing the steps of:
- identifying a set of data entries included in said request;
- applying a configuration criteria to compute a corresponding set of data patterns for said set of data entries;
- computing the legal values of said set of data patterns; and
- applying an access control list (ACL) for data processing to determine whether said request should be accepted or denied.

* * * * *